Aug. 31, 1965    T. E. SCHNEIDER, JR    3,203,440
DEVICE FOR FEEDING CHEMICALS INTO LIQUIDS
Filed Oct. 8, 1963    3 Sheets-Sheet 1

INVENTOR.
THOMAS E. SCHNEIDER, JR.
BY
Newton, Hopkins & Jones
ATTORNEYS

Aug. 31, 1965 T. E. SCHNEIDER, JR 3,203,440
DEVICE FOR FEEDING CHEMICALS INTO LIQUIDS
Filed Oct. 8, 1963 3 Sheets-Sheet 3

INVENTOR.
THOMAS E. SCHNEIDER, JR
BY
Newton, Hopkins & Jones
ATTORNEYS 3,203,440
DEVICE FOR FEEDING CHEMICALS
INTO LIQUIDS
Thomas E. Schneider, Jr., Atlanta, Ga., assignor to Tesco Chemicals, Inc., Atlanta, Ga., a corporation of Georgia
Filed Oct. 8, 1963, Ser. No. 314,754
7 Claims. (Cl. 137—268)

This invention relates to devices for chemicalizing a liquid with a material soluble in the liquid and more particularly, to a feeder device for feeding a chemical such as chlorine into a liquid such as water with the amount of the chemical fed to the liquid being proportional to the rate of flow of the liquid.

There are many requirements for the controlled addition of a chemical to a liquid. Typical of such requirements is the requirement for the controlled adding of chlorine to the water in a swimming pool. In the past, this has generally been accomplished by throwing a chloringe bearing compound in pellet or powdered form into the water of a swimming pool or by using relatively complicated apparatus to add chlorine in gaseous form to the water of a swimming pool as the water is circulated through a water filtration system of known type.

The use of chlorine bearing compounds in powdered or pellet form is troublesome and difficult to control since it is necessary to add the compound in powdered or pellet form on a regular or daily basis if a desired level of chlorination of the water is to be maintained. Although the various types of apparatus for adding chlorine in gaseous form to the water of a swimming pool avoid this difficulty associated with the use of chlorine bearing compounds in powdered or pellet form, these various types of relatively complicated apparatus possess the disadvantage of being expensive to manufacture, install, and maintain. In addition, there is a danger that the gaseous chlorine will leak into the atmosphere so as to create a hazard.

The feeder device disclosed herein permits the chlorine from a chlorine bearing compound to be automatically added to the water in a swimming pool in controlled predetermined amounts. The feeder device does not require daily attention and the chlorine level in the water in a swimming pool will be maintained at a substantially constant level even though the swimming pool and the feeder device are left unattended for extended periods of time. Moreover, the feeder device is relatively simple and uncomplicated so as to be inexpensive to manufacture, install, maintain, and there is no danger of gaseous chlorine escaping into the atmosphere. Although the feeder device is described herein as a feeder device for adding controlled amounts of chlorine to the water of a swimming pool, it will be readily apparent that the feeder device is equally adaptable to most applications requiring the controlled addition of a chemical to a liquid.

The feeder device disclosed herein achieves these and other improvements with respect to the adding of chlorine to water with a container member having a cavity, means for injecting the water to be chemically treated into the cavity of the container member so that the water passes as a thin, flat jet across the cavity in a substantially horizontal plane, a chlorine bearing compound in solid form and in a configuration such as a stick, means for supporting the end of the stick of chlorine bearing compound in the path of the jet of water, and means for removing the water from the cavity of the container member after the water has struck the stick of chlorine bearing compound. The result of this arrangement is that the jet of the water being treated progressively dissolves the stick of chlorine bearing compound in the plane of the jet until an entire layer of the stick of chlorine bearing compound is dissolved. When this occurs, a new length or layer of the stick of chlorine bearing compound drops into position in the plane of the jet and a progressive dissolving of this layer of the stick of chlorine bearing compound begins.

In the embodiment of the feeder device described herein, the stick of chlorine bearing compound has chlorine uniformly distributed throughout and, for a stick of chlorine bearing compound with a particular shape or configuration and a particular solubility rate, the rate at which the stick of chlorine bearing compound is dissolved by the feeder device is substantially dependent upon the velocity at which the jet of water strikes the stick of chlorine bearing compound. Thus, if the velocity of the jet is constant, the rate at which chlorine is added to the water is substantially constant.

The feeder device readily permits the amount of chlorine added to the water to be adjusted by simply changing the velocity with which the jet of water strikes the stick of chlorine bearing compound. The amount of chlorine added to the water may also be changed by varying the amount of chlorine in the stick of chlorine bearing compound, the shape or configuration of the stick of chlorine bearing compound, the configuration of the jet of water, or the solubility rate of the chlorine bearing compound.

These and other features and advantages of the invention will be more clearly understood from the following detailed description and the accompanying drawings in which like characters of reference designate corresponding parts in all figures and in which:

FIG. 5 is a perspective view of an embodiment of the stick of chlorine bearing compound suitable for obtaining a varying rate of chlorine addition to water with the feeder device.

Figure 1:
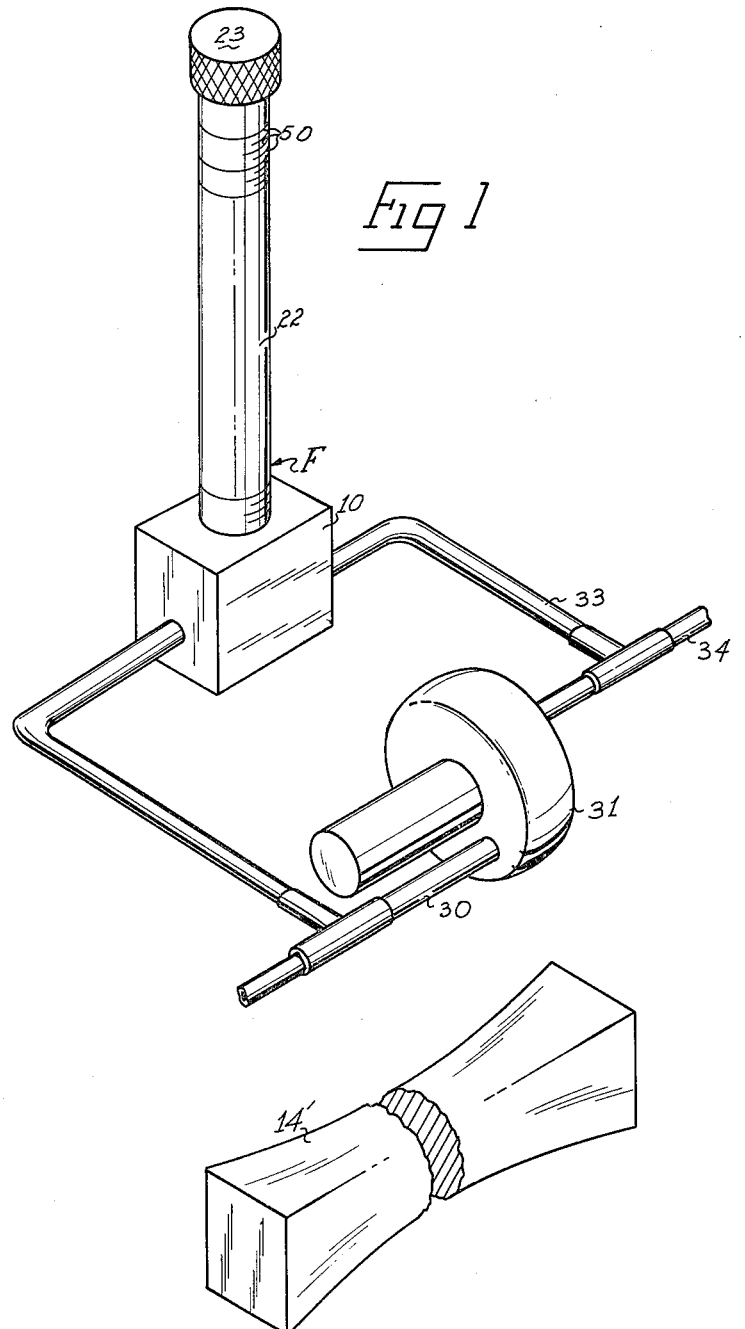
FIG. 1 is a perspective view of the feeder device connected to pressure and suction pipes on opposite sides of a pump as when the feeder device is used within the filtration system of a swimming pool.
Figure 2:
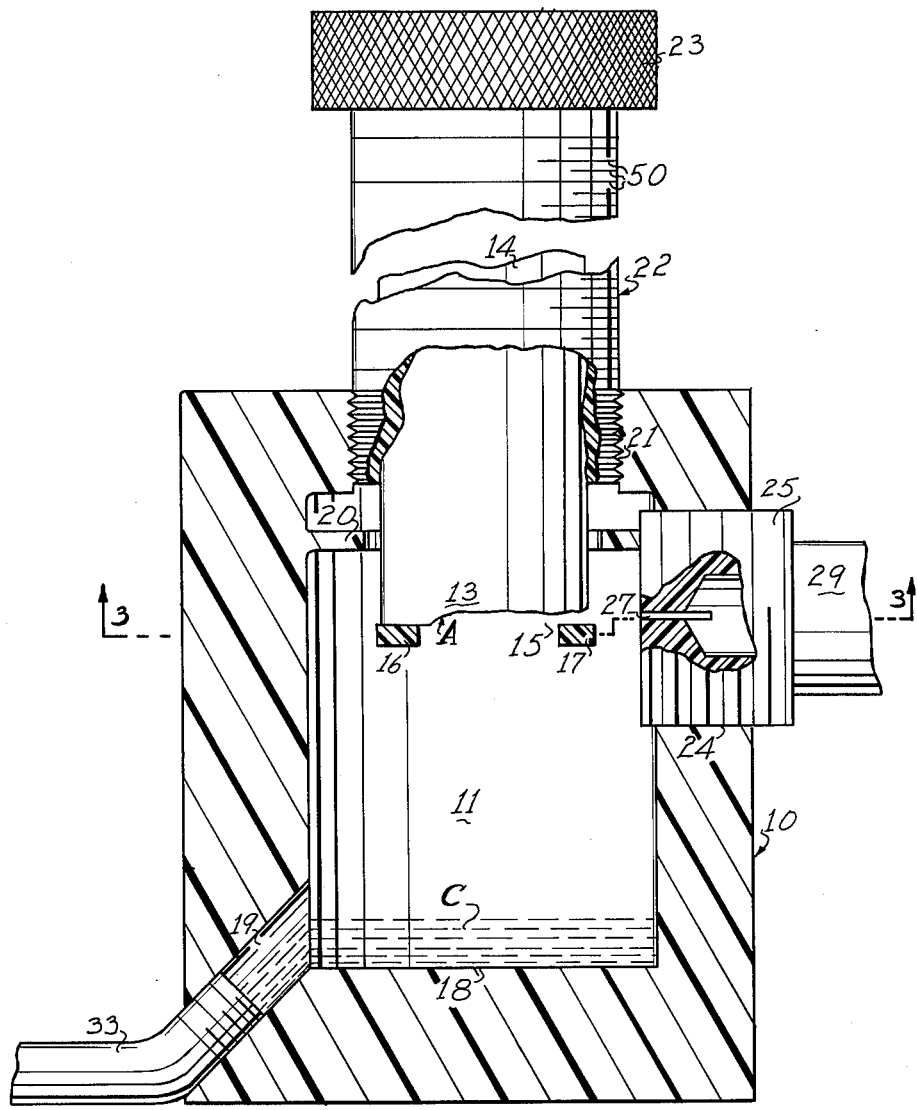
FIG. 2 is a side elevation view of the feeder device, partially in section and partially cut away, showing the manner in which the jet of water progressively dissolves layers of a stick of chlorine bearing compound.

These figures and the following detailed description disclose a preferred specific embodiment of the invention but the invention is not limited to the details disclosed herein since it may be embodied in other equivalent forms.

The feeder device disclosed herein is generally indicated in the figures by the letter F and is best understood as comprising a substantially box shaped container member 10 having a cylindrical cavity 11 into which the water to be chemically treated is injected under pressure through an injection nozzle 12 so as to strike the lower end 13 of a stick 14 of chlorine bearing compound. The injection nozzle 12 causes the water to be chemicaclly treated to enter the cavity 11 as a substantially flat jet 15 and with sufficient pressure for the jet 15 to traverse the cavity 11 in a substantially horizontal plane.

The lower end 13 of the stick 14 is positioned in the plane in which the jet 15 traverses the cavity 11 by support bars 16 and 17. After striking the stick 14, the water initially in the jet 15 contains chlorine and falls by gravity to the bottom 18 of the cavity 11 where the water passes from the cavity 11 through a discharge channel 19 as chemically treated water C.

The discharge channel 19 is sufficiently large to insure that the chemically treated water C leaves the cavity 11 at a rate which is sufficient to maintain the level of the chemically treated water C below the support bars 16 and 17 and the stick 14. A flange 20 integral with the container 10 extends from the wall of the cavity 11 so as to surround the stick 14 above the support bars 16 and 17 and above the jet 15. The flange 20 serves to prevent water in the jet 15 from splashing upward on the stick 14 as the jet 15 strikes the lower end 13 of the stick 14. Thus, the feeder device F insures that the stick 14 is dissolved only by the water in the jet 15.

The jet 15 initially strikes that portion of the lower end 13 of the stick 14 nearest the injection nozzle 12 in the plane of the jet 15. When this portion of the stick 14 is dissolved, portions of the stick 14 more remote from the injection nozzle 12 and in the same plane as the jet 15 are dissolved. The initial portion and the subsequent portions dissolved by the jet 15 define a plurality of faces A which the jet 15 strikes and dissolves in sequence as it dissolves the stick 14 and together, the faces A define a layer L. Thus, the stick 14 is dissolved by the jet 15 as a plurality of layers L and as a plurality of faces A within each layer L. The support bars 16 and 17 are positioned so as to support the lower end 13 of the stick 14 until all faces A in one of the layers L are dissolved by the jet 15.

Each of the faces A dissolved by the jet 15 is the surface of the stick 14 being struck at a particular moment by the jet 15. The surface of the stick 14 being struck at a practicular moment by the jet 15 is dependent upon the shape of the jet 15 perpendicular to its direction of motion toward the stick 14 and upon the configuration of the stick 14 with respect to an axis coinciding with the direction of motion of the jet 15. If the configuration of the stick 14 is selected to provide layers L uniform in cross section perpendicular to and along such an axis coinciding with the direction of motion of the jets 15 and if the shape of the jet 15 is maintained constant by constant water pressure, the faces A dissolved by the jet 15 in each layer L will be substantially identical within each layer L and from one layer L to another layer L. Thus, by the control of the jet 15 and proper selection of the configuration of the stick 14, the amount of chlorine entering the water may be maintained relatively constant.

The configuration of the stick 14 necessary to provide substantially constant addition of chlorine to water as described above may be obtained empirically or by computation in known manner. However, it has been found that a cylindrical stick 14 having layers L resembling circular discs is satisfactory for most applications requiring the controlled addition of a chemical such as chlorine to a liquid such as water. With a cylindrical stick, the faces A vary in size as the jet 15 dissolves a layer L so that there are slight variations in the rate at which the chlorine enters the water. However, successive layers L dissolved by the jet 15 are identical. Where the rate is based upon the amount of chlorine added to the water during the time required for the jet 15 to dissolve each layer L, the rate at which the chlorine is added to the water is constant. When the feeder device F is used to add chlorine to the water in a swimming pool and for other similar applications, a rate which is constant in terms of the time required to dissolve each successive layer L of the stick 14 is a satisfactory controlled rate.

From the foregoing, it will be apparent that the rate at which a chemical such as chlorine is added to a liquid such as water may be varied for a particular stick 14 simply by changing the pressure or velocity with which the jet 15 strikes the stick 14. As the velocity of the jet 15 increases, the dissolving rate increases thereby allowing the depth per unit of time to which the water in the jet 15 penetrates the stick 14 to increase.

It will also be apparent that the rate at which a chemical such as chlorine is added to a liquid such as water, may be varied for a particular stick 14 by changing the distribution or solubility rate of the chemical in the stick 14 in known manner so that the rate varies in accordance with whether a portion of the stick 14 with a high concentration of the chemical or high solubility rate or a portion of the stick 14 with a low concentration of the chemical or low solubility rate is being dissolved by the jet 15. The rate at which a chemical such as chlorine is added to a liquid such as water with a particular stick 14 may also be varied by changing the configuration of the stick 14 along its length. Thus, a stick 14' having a relatively large square cross section for a portion of its length and a relatively small circular cross section for a portion of its length will cause the faces A in the layer L dissolved by the jet 15 to change or vary as successive layers L are placed in the plane of the jet 15. As the faces A vary, the rate at which the chemical such as chlorine is added to the liquid such as water varies for the reasons indicated above.

The rate at which a chemical such as chlorine is added to a liquid such as water may be changed from stick 14 to stick 14 in similar fashion. The sticks 14 are formed in a variety of shapes or configurations, and the feeder device F permits a chemical such as chlorine to be added to a liquid such as water in a controlled manner at constant rates and at varying rates depending upon the configurations or shapes of the sticks 14 selected and the velocity of the jet 15 of water.

Moreover, in addition to being formed in a variety of shapes and configurations, when the feeder device F is used to add chlorine to water, the stick 14 may be formed of any slowly dissolving but totally soluble organic chlorine compound such as a compound which contains active chlorine attached to a nitrogen atom of the compound where the nitrogen atom is in an amine or amide arrangement within the compound. When formed of such compound, the sticks 14 are compressed into the particular shape or configuration desired and best suited for the application of the feeder device using known techniques.

It will be apparent from the foregoing that the container member 10 may be of any material such as plastic which is resistant to the chemical with which the liquid such as water is to be treated and in which the cavity 11 is easily formed. The cavity 11 is continuous at its upper end with a threaded tube channel 21 into which the lower end of a stick container 22 is threadably inserted. The upper end of the stick container 22 is closed by a removable cap 23. It is within the stick container 22 that the stick 14 is positioned with its lower end 13 extending downward from the stick container 22 into the cavity 11. By removing the cap 23 from the stick container 22, the sticks 14 can be easily placed within the stick container 22. Replacing the cap 23 prevents water and debris from entering the stick container 22 and the cavity 11.

Figure 3:
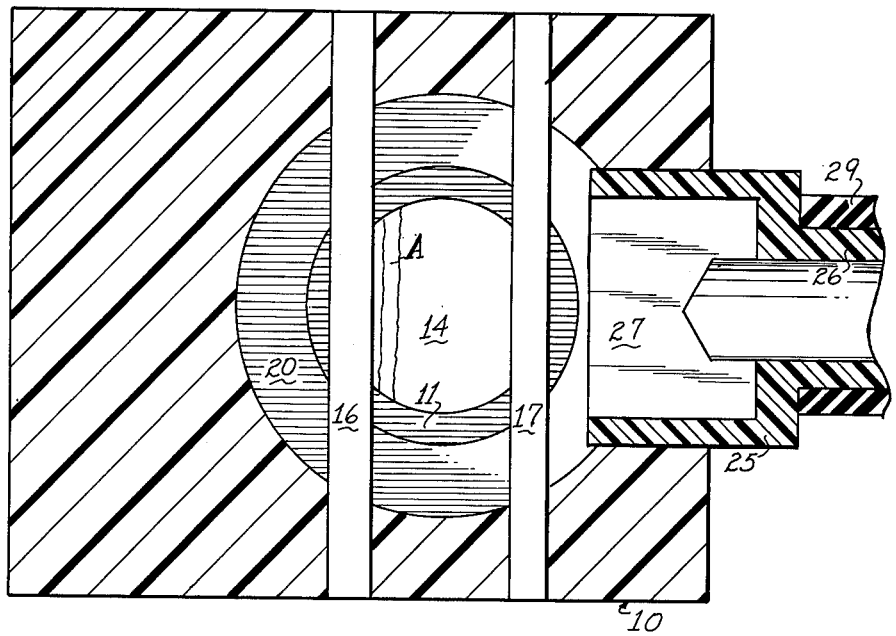
FIG. 3 is a section view taken substantially along the line 3—3 in FIG. 2 showing the injection slit and the support bars on which the stick of chlorine bearing compound rests.
Figure 4:
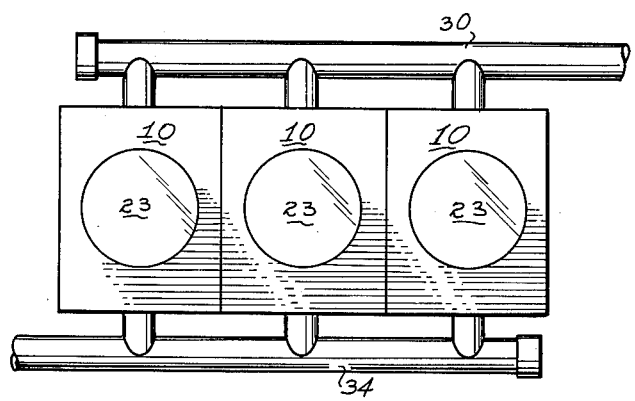
FIG. 4 is a top plan view of a plurality of the feeder devices arranged to provide increased chlorination of a quantity of water by use of multiple feeder devices.

A nozzle port 24 extends from the cavity 11 through the side of the container member 10 and it is into the nozzle port 24 that the nozzle 12 is threadedly inserted so as to extend from the cavity 11 through the side of the container member 10. The nozzle 12 comprises a circular plug 25 continuous with a nipple 26. A horizontal slit 27 extends into the plug 25 with a channel 28 extending through the nipple 26. The result of this arrangement is that when the nipple 26 is connected in known manner by a tube 29 to a source of water under pressure such as a pipe 30 leading from the pressure side of a pump 31 used in the water filtration system of a swimming pool, water enters the nozzle 12 and is discharged through the slit 27 to pass as a substantially flat horizontal jet 15 across the cavity 11. As seen in FIG. 3, the jet forming slit 27 of the nozzle 12 is as broad or broader than the possible maximum cross-section of any stick 14 which may be accommodated in the container 22. Thus, the transverse area of impingement and hence the rate of erosion and/or dissolution has as one controlling factor the transverse area of the stick. As indicated in FIG. 5, such area may vary throughout the length of the stick. Since the liquid is directed toward the stick in a broad flat plane normal to the axis of the stick and wider than the cross section of the stick, only that portion of the total width of the jet intercepted by the stick will be effective in the erosion and/or dissolution of the slowly soluble chemical bearing compound.

As has been noted, the stick 14 is only slowly soluble. Thus it may be characterized as a hard liquid resistant substance of such nature as to resist rapid dissolution in solid form and in contact with merely quiescent solvent. However, since, as is fully recognized, the solubility rate of any substance is in direct relation to the area exposed to the solvent, fine particulate material as formed by erosion is readily soluble in comparison to slowly soluble solid bodies such as the stick 14 of the present invention. Hence, the erosive effect of the direct right angular impingement of the jet of the present apparatus is important in reducing the solid slowly soluble body of the stick to readily soluble grains or globules.

The support bars 16 and 17 are positioned to hold the lower end 13 of the stick 14 in the plane of the jet 15 without the support bars 16 and 17 being in the plane of the jet 15. This is most conveniently done by extending the support bars 16 and 17 completely through the container member 10 in a horizontal plane which is just below the plane of the jet 15. The support bars 16 and 17 are positioned within the cavity 11 so that they are engaged by the peripheral edges of the lower end 13 of the stick 14 and so that the peripheral edge of the lower end 13 of the stick 14 engaging the support bar 16 is the last face A to be dissolved by the jet 15 in each layer L of the stick 14. Thus, the support bars 16 and 17 insure that the stick 14 does not move downward into the cavity 11 until each layer L is completely dissolved. Although the support bars 16 and 17 are easy to install, it is apparent that the support bars 16 and 17 may be replaced by wire mesh or other similar means for supporting the lower end 13 of the stick 14 until a complete layer L is dissolved.

The discharge channel 19 extends downwardly from the cavity 11 through the container member 10 from adjacent the bottom 18 of the cavity 11. As indicated above, the discharge channel 19 is of sufficient size and the depth of the cavity 11 is sufficiently great to insure that water falling from the lower end 13 of the stick 14 toward the bottom 18 of the cavity 11 does not accumulate in the lower end of the cavity 11 or splash upward to such an extent as to engage the lower end 13 of the stick 14 or the jet 15. In some applications of the feeder device F, the removal of the chemically treated water C from the lower end of the cavity 11 is facilitated by connecting the discharge channel 19 with tubing 33 of known type to a pipe 34 leading to the suction side of the pump 31 of the filtration system for a swimming pool. Thus, in applications such as this the water is injected into the cavity 11 from the pressure side of the pump 31 and removed as chemically treated water C from the cavity 11 by the suction side of the pump 31. The feeder device F of the invention performs in a highly efficient manner in such an arrangement.

Moreover, where it is desired in such an arrangement to increase the amount of a chemical such as chlorine added to a liquid such as water without changing the pressure with which the jet strikes the stick 14, the configuration of the stick 14, the solubility rate of the stick 14, or the distribution of the chemical within the stick 14, a plurality of feeder devices F may be placed in parallel between the pipe 30 extending from the pressure side 31 and the pipe 34 connected to the suction side of the pump 31. The amount of chemical such as chlorine added to a liquid such as water will be substantially equal to the amount of chemical added by a single feeder device F multiplied by the number of feeder devices F arranged in parallel. It will be apparent that a similar arrangement of feeder devices F in parallel is possible where the chemically treated water C is removed from each feeder device simply by gravity.

To permit periodic ascertaining and recording of the amount of chlorine or other chemical added to the liquid passing through the feeder device F, the stick container 22 is transparent and has indicia 50 along its length arranged in terms of the amount of chlorine in each unit of length of the stick 14. The indicia 50 also allow the operator of the feeder device F to easily detect when the stick container 22 needs another stick 14 of the chemical compound.

It will be obvious to those skilled in the art that many variations may be made in the embodiments chosen for the purpose of illustrating the present invention without departing from the scope thereof as defined by the appended claims.

What is claimed as invention is:

1. A device for feeding chemicals into a liquid comprising a holder having means for retaining a solid body of soluble chemical bearing compound against lateral displacement, and means for directing a jet of liquid laterally of said holder and in a direction toward and substantially normal to a side of a solid body of soluble chemical bearing compound retained by said holder.

2. A device for feeding chemicals into a liquid comprising a holder having means for retaining a solid vertically elongate stick of soluble chemical bearing compound against lateral displacement with respect to said holder, and means for directing a thin flat jet of liquid laterally across said holder in a plane substantially transverse of and normal to the vertical axis of a solid vertically elongate stick of soluble chemical bearing compound retained by said holder, said means being constructed and arranged for eroding impingement of the jet against a stick retained by said holder upon contact of said jet therewith.

3. A device for feeding chemicals into a liquid comprising a holder for retaining an elongate solid stick of soluble chemical bearing compound against lateral displacement and with one end protruding from the holder, and means spaced from said holder for directing a thin flat eroding jet of liquid in a direction laterally of said holder, said means being constructed and arranged for said jet to impinge against a side of a protruding end of an elongate solid stick of soluble chemical bearing compound retained by said holder while moving in a plane substantially normal to said side.

4. A device for chlorinating swimming pool water comprising a holder having means for receiving a solid elongate stick of slowly soluble chlorine bearing compound with one end of the stick protruding therefrom, a support for the protruding end of a stick received in said holder, a nozzle spaced from the protruding end of a stick received in said holder, means in said nozzle for directing a jet of swimming pool water to strike the protruding end of a stick received in said holder, said means being constructed and arranged for said jet to erode the protruding end of a stick received in said holder in longitudinally successive end layers, and means for supplying swimming pool water to said nozzle under pressure to produce said jet.

5. Means for chlorinating swimming pool water by successively dissolving successive portions of a body of soluble solid chlorine bearing compound in continuously flowing swimming pool water comprising a holder for a body of soluble solid chlorine bearing compound, means for successively exposing successive limited areas of one end of a body of soluble solid chlorine bearing compound in said holder, a jet forming nozzle in combination with said holder constructed and arranged to form and deliver a jet of swimming pool water against successively exposed areas of one end of a body of chlorine bearing compound in said holder, and means for continuously delivering swimming pool water to said jet forming nozzle.

6. A device for chlorinating swimming pool water, including an elongate container open at its lower end for receiving an elongate body of slowly soluble chlorine bearing compound, a fixed supporting bar in spaced relation to the lower end of said container for supporting an elongate body of slowly soluble chlorine bearing compound mounted in said container with a portion protruding therefrom, a jet forming nozzle in combination with said holder constructed and arranged to deliver a jet between the open end of said holder and said fixed supporting bar, and means for delivering swimming pool water under pressure to said nozzle.

7. A device for dissolving successive predetermined lengths of a stick of chemical bearing compound, comprising a holder having an open lower end for receiving a stick of chemical bearing compound, a support disposed below the lower end of said holder in a position for one edge of a stick of chemical bearing compound in said holder to be engaged and retained by said support, a nozzle in combination with said holder, means in said nozzle defining a jet for delivering a stream of solvent liquid between said support and the lower end of said holder, said means being constructed and arranged for said jet to erode successive exposed perpendicular faces of a stick of chemical bearing compound until a face resting on said support is dissolved, and means for delivering a solvent liquid under pressure to said nozzle.

References Cited by the Examiner
UNITED STATES PATENTS 2,538,720  1/51  Wood _____ 23—272.8
2,820,701  1/58  Leslie _____ 23—271

M. CARY NELSON, *Primary Examiner.*

HENRY T. KLINKSIEK, *Examiner.*